Jan. 12, 1926.  
G. W. MacKENZIE  
1,569,769  
LIQUID STORAGE AND SUPPLY SYSTEM  
Filed Dec. 17, 1920
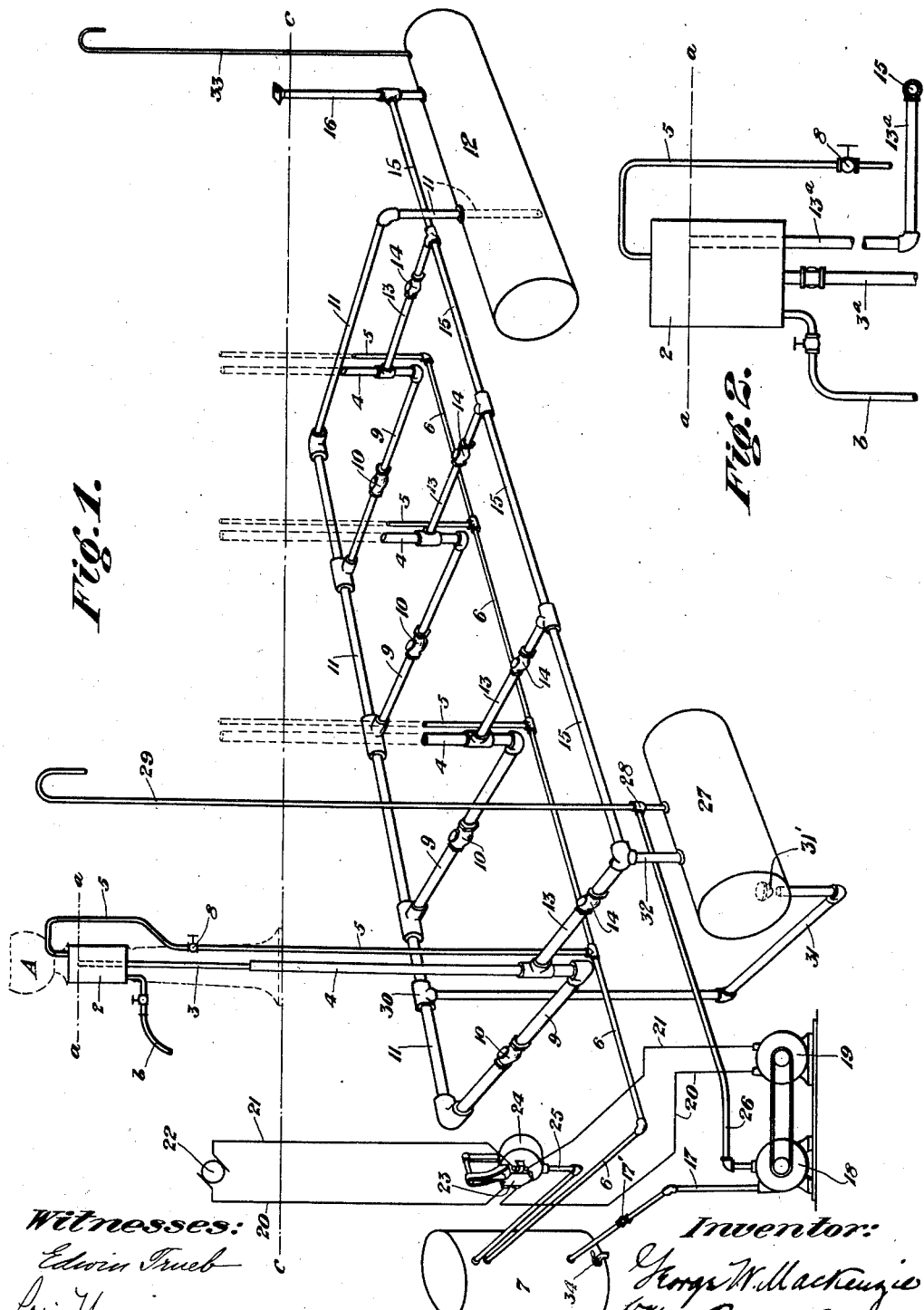

Patented Jan. 12, 1926.

1,569,769

UNITED STATES PATENT OFFICE.

GEORGE W. MacKENZIE, OF BEAVER, PENNSYLVANIA, ASSIGNOR TO GUARANTEE LIQUID MEASURE COMPANY, OF ROCHESTER, PENNSYLVANIA, A CORPORATION OF DELAWARE.

LIQUID STORAGE AND SUPPLY SYSTEM.

Application filed December 17, 1920. Serial No. 431,512.

*To all whom it may concern:*

Be it known that I, GEORGE W. MAC-KENZIE, a citizen of the United States, residing at Beaver, in the county of Beaver and State of Pennsylvania, have invented certain new and useful Improvements in Liquid Storage and Supply Systems, of which the following is a specification.

My invention relates to the storage and delivery to consumers in measured amounts of any vendible liquid, as gasoline. It has in view to provide a system whereby a series of individual measuring pumps or other measuring vessels are placed in communication with a main reservoir and also with a controlling or master vacuum tank, so that each of the pumps may be used independently of the other, or two or more together, to perform its or their functions in delivering measured amounts of liquid.

In the drawings:

Fig. 1 is a perspective view showing a typical installation of the system; and

Fig. 2 is a detail sectional view showing a modified construction, utilizing a different supply and overflow for the measuring vessel.

The pump utilized is similar to that of my prior Patents No. 1,297,210 and No. 1,326,207, and is generally indicated by the letter A. It is merely shown in outline, somewhat diagrammatically, but is provided with a casing 2 usually of glass into which liquid is delivered by the adjustable level defining section 3 of a pipe 4. Flow of the liquid is induced by the partial vacuum within the sealed casing 2 upon exhausting the air therefrom by air line 5, connected to a common trunk suction line 6 of vacuum tank 7. Line 5 is provided with a three way valve 8 adapted to connect the interior of the casing with the main suction or to open it to the atmosphere for re-establishment of normal pressure, at the same time, sealing the main suction, and allowing the measured contents of casing 2 to be drawn off through delivery hose *b*.

It will be understood that adjustable section 3 determines the measured level of the liquid as on the level *a*, *a*, and that any surplus runs back through pipes 3 and 4 to the main tank. As shown, each supply pipe 4 is connected by branch line 9 having a check valve 10 with a main trunk feed line 11 leading to the bottom of main reservoir 12. Pipe 4 of each measuring pump A is also connected by branch line 13 having a check valve 14 with trunk return line 15 leading by branch pipe 32 to the separate tank 27 for return of any surplus liquid. Line 15 may, for convenience, be connected with the filling pipe 16 of reservoir 12, as shown, and each check valve 14 will close against suction in casing 2. On the contrary, each check valve 10 will seat against gravitating return flow and will open only when there is suction in feed line 4. By this means, pipe 11 will remain full at all times, ready to deliver promptly through branch line 9 and its check valve whenever suction line 5 is put in communication with main suction line 6 of vacuum tank 7, by opening valve 8.

An important and essential feature of the system is that the vacuum conditions of master tank 7 shall be maintained at approximately the same degree. For such purpose, I provide means for renewing the suction by reducing the pressure which are controlled by the partial vacuum condition itself, and for terminating the operation of such means when the desired normal partial vacuum condition is restored. Air is exhausted from tank 7 from time to time by pipe 17, through check valve 17', by vacuum pump 18, and the pump is geared with electric motor 19 for operation in exhausting the air from the tank each time the motor is operated. Current is supplied to the motor by conducting wires 20, 21, from any suitable source, as a generator 22, through switch 23. Switch 23 in turn is closed or opened by any suitable mechanism, as a diaphragm, enclosed in casing 24 and subject to variations of the vacuum conditions of tank 7, through connecting pipe 25. Switch 23 and its vacuum controlled mechanism are of well known construction, and need not be described herein in detail.

Its function is to maintain the partial vacuum in tank 7 between a minimum and a maximum of atmospheric pressure so that when the pressure rises above the maximum and requires renewal by starting and operating vaccum pump 18, the switch 23 will be closed to effect closing of the circuit through conductors 20 and 21 to the motor 19. Likewise, the pressure having been reduced to the minimum, the switch is again operated to break the circuit, terminating the operation of the motor and pump which remain inactive until it becomes again necessary to repeat the operation. Owing to the fact that the tank 7 is designed to operate a number of the measuring tanks or pumps A, its capacity is of considerable size and volume so that there is always maintained an adequate surplus of suction, even though two or more of the measuring machines be in use at the same time.

In the use of vacuum pumps like pump 18, due to the constant exhaustion of the air from tank 7 through pipe 6 and the several branch pipes 5 communicating with the measuring vessel 2, there is a gradual accumulation of condensed gasoline vapor, carried over to tank 7, which passes through the pump and which must be disposed of. I therefore provide a return pipe 26 connecting pump 18 with the separate tank 27 by connection 28 with the vent pipe 29 thereof. By this means, there is maintained a constant communication with the atmosphere and also with the tank 27, whereby to allow for escape of excess air and for collection of any condensed vapors or gasoline from the pump.

Any such collected gasoline from return lines 13—15—32 or the pump is utilized in the system by connecting tank 27 with main supply line 11, as at 30, by pipe 31, with a suitable float or check 31' inside the tank. Main reservoir 12 is also provided with the usual vent pipe 33 and vacuum tank 7 has a cock 34 for carrying off any accumulated gasoline, from time to time. If desired, each measuring vessel 2 may also be provided with a separate feed line 3ª and a fixed overflow or return line 13ª extending upwardly into the vessel to any predetermined height, as for a five gallon measurement, and connected directly to return line 15, as in Fig. 2. This arrangement may be adopted where it is not necessary to vary the measurement, the surplus being returned by gravity upon opening valve 8 to the atmosphere.

The entire installation of the system is designed to be under ground and below the ground level indicated generally by the line c, c, except the connecting pipes 4 and 5 which extend upwardly for communication with the measuring and vending machines. The arrangement of the piping and of the several working elements and the several connections is, of course, subject to change or re-arrangement, depending upon the locality or other conditions present, and the invention is in no way limited to the particular construction, arrangement, or location of the parts shown, but may be variously changed or modified by the designing engineer or builder to suit such conditions or to adapt it otherwise to any other controlling factor.

The operation is as follows:

Reservoir 12 being filled with gasoline or other liquid to be measured and distributed by either of the machines A, and the desired vacuum conditions existing in tank 7, three-way valve 8 is turned to put suction line 6 in communication with the interior of measuring vessel 2 by branch line 5. Thereupon, the air having been sufficiently exhausted from vessel 2, atmospheric pressure will force the liquid from reservoir 12 and main line 11, through check valve 10 and branch 9, upwardly through compound conduit 4—3, filling the vessel 2 to the desired level, for instance, as indicated, a five gallon measurement. Valve 8 is then reversed, closing the suction communication and opening the interior of the measuring tank to the atmosphere. Thereupon, any undesired surplus in vessel 2 will return through conduit 3—4, branch line 13, check valve 14, and main line 15, or through pipe 32, back to reservoir 12 or 27. The measured contents of vessel 2 may be then withdrawn, as into the tank of an automobile, by valve controlled delivery hose b.

By reason of the general arrangement of the parts and of the surplus air exhausting power of tank 7, and of the practically automatic renewal from time to time of the vacuum conditions therein, it will be seen that practically any usable number of vending machines may be coupled up with the system and used continuously without impairing the efficiency of the apparatus. The presence of the check valve 10 in the several branch lines 9 maintains an immediately available quantity of liquid at all times ready for movement up to the measuring vessel without appreciable delay. The independent operation of an air exhaust pump to effect desired vacuum conditions in the vending machine is therefore rendered unnecessary and in the aggregate effects a very material economy of time. This is because there is an immediate application of the already established vacuum and suction of the storage tank 7, instead of having to start a separate pump for each operation with the necessary incidental delay in order to effect the required vacuum.

The general efficiency of the system is also largely amplified and the cost of its installation and operation, proportioned to the increased number of vending machines, possible, is greatly reduced.

The advantage of the invention will be readily understood and appreciated by all those familiar with this class of apparatus, and it provides a very desirable plural unit installation for the purposes intended.

What I claim is:

1. A liquid storage and dispensing system comprising a storage tank, a plurality of dispensing devices, a common supply line leading from the storage tank to the dispensing devices, a common return line connected with each dispensing device, and auxiliary tank with which the return line connects, a check valve between each dispenser and the supply line, a check valve between each dispenser and the return line, and means whereby liquid from the auxiliary tank may be returned directly to the supply line.

2. A liquid storage and dispensing system comprising a storage tank, a plurality of suction filled dispensing devices, a common supply line leading from the storage tank to the dispensing devices, a common return line connected with each dispensing device, an auxiliary tank with which the return line connects, a check valve between each dispenser and the supply line, a check valve between each dispenser and the return line, means whereby liquid from the auxiliary tank may be returned to the supply line, a suction tank communicating with each dispenser, a pump for exhausting said tank, an exhaust for the pump, and a drain pipe connection from the exhaust to the auxiliary tank for draining condensate from the exhaust into the auxiliary tank.

In testimony whereof I hereunto affix my signature.

GEORGE W. MacKENZIE.